Patented Aug. 17, 1937

2,090,201

UNITED STATES PATENT OFFICE 2,090,201

BISMUTH SALTS OF CARBOXYLIC ACIDS

Walter Herrmann, Friedrich Hampe, and Walther Persch, Frankfort-on-the-Main, Germany, assignors to Winthrop Chemical Company, Inc., New York, N. Y., a corporation of New York No Drawing. Application April 17, 1935, Serial No. 16,928. In Germany May 4, 1934

6 Claims. (Cl. 260—11)

The present invention relates to bismuth salts of carboxylic acids.

It is known to prepare bismuth salts of organic acids for therapeutic purposes by causing an inorganic bismuth salt to react with an organic acid.

This invention is based on the observation that also bismuth salts containing in one molecule various different organic acid radicals only one of which is as such capable of forming bismuth salts well soluble in oils, possess good pharmacological properties. Moreover, they are very stable. The solutions of these salts in oils remain clear, even on access of air, so that they may be filled into bottles without any precaution and are stable therein for any time. These salts have the further advantage to be soluble in oils even if the bismuth salt of one acid component is in itself very difficultly soluble in oil. The process of this invention therefore allows of rendering soluble in oils bismuth salts of organic acids very difficultly soluble in oils. This is highly important in therapy, since it is only thus possible that the bismuth salts can be used with advantage for injection purposes. Hitherto it has, for instance, not been possible to inject bismuth salicylate in a dissolved form, whereas by the process of this invention there may be prepared bismuth salts capable of being injected and containing a salicylic acid radical.

Such a mixed bismuth salt may be prepared by heating a difficultly soluble basic bismuth salt with an organic acid until dissolution occurs or by causing the solution of a bismuth salt to react with two molecular proportions of the sodium salt of the one acid and one molecular proportion of the sodium salt of the other acid in an aqueous solution. The bismuth salt used as starting material, particularly bismuth nitrate, may be dissolved in an aqueous solution of glycerine or mannite in order to avoid hydrolysis.

Oils suitable for the preparation of the solutions are: pharmaceutically indifferent, vegetable or animal oils as they are used in medicine for injecting remedies. These oils are in most cases esters of higher fatty acids with more than 15 carbon atoms. There may be used, for instance, olive oil, earth nut oil, beech nut oil, sesame oil, rapeseed oil, bone oil.

Acids which are readily soluble in oils, i. e. acids the bismuth salts of which yield solutions of at least about 8 per cent strength, are the hydroaromatic carboxylic acids, particularly hydroaromatic endomethylene-benzoic acids as they are described, for instance, in Patent No. 1,991,783 dated February 19, 1935 and in the co-pending application Serial No. 697,078 filed November 7, 1933, in the name of Max Bockmühl, Walter Persch and Gustav Ehrhart; furthermore higher molecular carboxylic acids and higher molecular derivatives of lower molecular carboxylic acids, for instance, camphocarboxylic acid, naphthenic acid, abietinic acid, carboxylic acids of terpenes, amylmalonic acid monoethylester, undecylmalonic acid monoethylester.

As acids the bismuth salts of which are comparatively difficulty soluble there may, for instance, be used phthalic acid monobenzylester, phenylacetic acid, anthranilic acid, tetrahydrobenzoic acid, salicylic acid, acetylsalicylic acid. Lower molecular, particularly aliphatic acids are not suitable since they are in most cases too strong.

The following examples illustrate the invention:

(1) 34 grams of camphenilanic acid and 14 grams of salicylic acid are dissolved together in the form of their sodium salts in 150 cc. of water and into the solution so obtained there is introduced a solution of 49 grams of bismuth nitrate in 150 cc. of glycerine and 300 cc. of water. The resultant precipitate of the bismuth salt is dissolved in benzene and mixed with the desired quantity of an oil. The benzene is distilled whereupon the stable solution of the mixed bismuth salt of camphenilanic acid and salicylic acid is obtained.

(2) 34 grams of camphenilanic acid and 18 grams of acetylsalicylic acid are dissolved together in the form of their sodium salts in 150 cc. of water and into the solution so obtained there is introduced a solution of 49 grams of bismuth nitrate in 450 cc. of a mannite solution of 20 per cent strength. The further treatment is as described in the preceding example.

In a similar manner there may, for instance, be prepared the mixed bismuth salts from two molecular proportions of camphenilanic acid and one molecular proportion of oleic acid or two molecular proportions of campholytic acid and one molecular proportion of stearic acid or two molecular proportions of naphthenic acid and one molecular proportion of phthalic acid monobenzyl ester or two molecular proportions of camphenilanic acid and one molecular proportion of oleylsarcosine or two molecular proportions of camphenilanic acid and one molecular proportion of phenylacetic acid, etc.

(3) 60 grams of camphenilanic acid are dissolved in 150 grams of olive oil and the solution so obtained is heated with 10 grams of bismuth salicylate until dissolution has occurred. The solution is clear and stable.

(4) 31 grams of campholytic acid and 14 grams of salicylic acid are dissolved together in the form of their sodium salts in a mixture of 75 cc. of glycerine and 75 cc. of water; into the solution thus obtained there is run a solution of 49 grams of bismuth nitrate in 150 cc. of glycerine and 300 cc. of water. The further treatment is as indicated in Example 1.

We claim:

1. Mixed carboxylic acid salts of bismuth in which one bismuth atom is bound to a carboxylic acid radical containing a six-membered carboxylic ring and forming bismuth salts difficultly soluble in oils and to a hydroaromatic carboxylic acid radical forming bismuth salts well soluble in oils, said mixed salts being stable and well soluble in oils.

2. Mixed carboxylic acid salts of bismuth in which one bismuth atom is bound to one carboxylic acid radical containing a six-membered carboxylic ring and forming bismuth salts difficultly soluble in oils and to two hydroaromatic carboxylic acid radicals forming bismuth salts well soluble in oils, said mixed salts being stable and well soluble in oils.

3. Mixed carboxylic acid salts of bismuth in which one bismuth atom is bound to one carboxylic acid radical containing a six-membered carboxylic ring and forming bismuth salts difficultly soluble in oils and to two radicals of a hydroaromatic-endomethylene benzoic acid, said mixed salts being stable and well soluble in oils.

4. The mixed carboxylic acid salt of bismuth in which one bismuth atom is bound to one radical of salicylic acid and to two radicals of camphenilanic acid, said mixed salt being stable and well soluble in oils.

5. The mixed carboxylic acid salt of bismuth in which one bismuth atom is bound to one radical of acetylsalicylic acid and to two radicals of camphenilanic acid, said mixed salt being stable and well soluble in oils.

6. The mixed carboxylic acid salt of bismuth in which one bismuth atom is bound to one radical of salicylic acid and to two radicals of campholytic acid, said mixed salt being stable and well soluble in oils.

WALTER HERRMANN.
FRIEDRICH HAMPE.
WALTHER PERSCH.